UNITED STATES PATENT OFFICE.

ERNEST E. SCHMIDT, OF BOSTON, MASSACHUSETTS.

SAFETY WRITING-INK.

1,296,858.      Specification of Letters Patent.     Patented Mar. 11, 1919.

No Drawing.     Application filed July 25, 1918. Serial No. 246,711.

*To all whom it may concern:*

Be it known that I, ERNEST E. SCHMIDT, a citizen of the United States, residing at Boston, in the county of Suffolk and State of Massachusetts, have invented new and useful Improvements in Safety Writing-Ink, of which the following is a specification.

This invention has for its object the production of a writing-ink, which when used on checks, drafts, etc., cannot be successfully removed by acid and alkaline ink eradicators, is water-proof and indelible, has a fast color, is adapted to sink into or penetrate the paper so deeply as to prevent successful mechanical erasure, and is adapted to be quickly and conveniently manufactured by dissolving certain ingredients in water, to form a true solution, or in other words, a solution adapted to stand indefinitely without precipitation or sedimentation. I employ water-soluble ingredients including ferro-cyanid of iron (commonly called water-soluble Prussian blue) which constitutes a coloring ingredient, a solution-maintaining ingredient, preferably oxalic acid crystals, a color-fixing ingredient, preferably Epsom salts, and a water-soluble oil constituting a penetrative ingredient causing the ink to deeply penetrate the paper, said oil being preferably that commercially known as Turkey-red oil.

Said ingredients are dissolved in a sufficient quantity of soft water to form a true solution. The following are the preferred proportions:

Ferro-cyanid of iron—three hundred and twenty grains;
Oxalic acid crystals,—thirty grains;
Epsom salts,—ten grains;
Turkey-red oil,—thirty drops;
Soft water,—one quart.

These proportions may be varied without departure from the spirit of the invention.

When the soluble ingredients and the water are well shaken, the ink is manufactured and is ready for use. The ferro-cyanid of iron gives the ink a sufficiently strong color. The oxalic acid not only maintains the solution in true form, but darkens the color of the ink, and assists in making it indelible. The Epsom salts not only fixes the color of the ink, but also prevents it from smearing or smudging, and makes it water-proof. The Turkey-red oil causes the ink to sink into the pores of the paper, so that the ink cannot be successfully erased mechanically. The penetration of the ink depends on the quantity of oil employed, it being feasible to use enough oil to cause the ink to entirely penetrate the paper and be visible on the back of the latter. The oil causes the ink to sink so quickly into the paper that the use of a blotter is unnecessary. Turkey-red oil, otherwise called water-soluble oil, as known commercially, is sulfonated castor oil, the formula being understood to be $C_{18}H_{33}O_2.O.SO_3H$.

So-called soluble Prussian blue, forms what is known as a colloidal solution. This can only be distinguished from a true solution by the use of an ultra microscope and is, therefore, just as valuable for the manufacture of ink as a true solution. This colloidal solution is not coagulated by the acid and salts present for the following two reasons:

(1) The proportion of acid and salts is too small;

(2) The Turkey red oil prevents any tendency toward coagulation on account of its property as a protective, or "Schutz kolloid".

Epsom salts do not react with oxalic acid to form an insoluble compound, since magnesium oxalate is soluble in acids and any of this substance which might be formed would remain in solution due to the sulfuric acid which would be formed simultaneously. Therefore, the ink made according to the formula submitted, is a colloidal solution in which there is no tendency of the color to precipitate.

So-called soluble Prussian blue, is known, chemically, as potassium ferric ferrocyanid, possessing the formula,

$$KFe.Fe(CN)_6.3\tfrac{1}{2}H_2O.$$

(See Watts' *Dictionary of Chemistry*, vol. 2, page 339.)

It is evident that the whole compound may be considered water-soluble, in the sense of a colloidal solution.

I claim:

1. Safety writing ink made from water, and water-soluble ingredients including ferro-cyanid of iron constituting a coloring ingredient, a solution-maintaining ingredient, a color-fixing ingredient, and a water-soluble oil, constituting a penetrative ingredient.

2. Safety writing ink made from water, and water-soluble ingredients including ferro-cyanid of iron constituting a coloring ingredient, oxalic acid constituting a solution-maintaining ingredient, a color-fixing ingredient, and a water-soluble oil, constituting a penetrative ingredient.

3. Safety writing ink made from water and water-soluble ingredients including ferro-cyanid of iron constituting a coloring ingredient, a solution-maintaining ingredient, Epsom salts constituting a color-fixing ingredient, and a water-soluble oil, constituting a penetrative ingredient.

4. Safety writing ink made from water, and water-soluble ingredients including ferro-cyanid of iron constituting a coloring ingredient, oxalic acid constituting a solution-maintaining ingredient, Epsom salts constituting a color-fixing ingredient, and Turkey-red oil constituting a penetrative ingredient.

In testimony whereof I have affixed my signature.

ERNEST E. SCHMIDT.